(12) United States Patent
Rechichi

(10) Patent No.: US 6,399,848 B1
(45) Date of Patent: Jun. 4, 2002

(54) ENCAPSULATION OF HAZARDOUS WASTE MATERIALS

(75) Inventor: Dino Rechichi, Reedy Creek (AU)

(73) Assignee: Dolomatrix International Limited, Sydney (AU)

(*) Notice: Subject to any disclaimer, the term of this patent is extended or adjusted under 35 U.S.C. 154(b) by 0 days.

(21) Appl. No.: 09/424,676

(22) PCT Filed: May 29, 1998

(86) PCT No.: PCT/AU98/00408

§ 371 (c)(1),
(2), (4) Date: Feb. 15, 2000

(87) PCT Pub. No.: WO98/54107

PCT Pub. Date: Dec. 3, 1998

(30) Foreign Application Priority Data

| May 29, 1997 | (AU) | ............................................. | PO 7055 |
| Sep. 18, 1997 | (AU) | ............................................. | PO 9269 |
| Sep. 18, 1997 | (AU) | ............................................. | PO 9270 |
| Apr. 22, 1998 | (AU) | ............................................. | PP 3158 |

(51) Int. Cl.⁷ ............................... G21F 9/16; A62D 3/00
(52) U.S. Cl. ................ 588/2; 588/3; 588/4; 588/15; 588/18; 588/236; 588/252; 588/256
(58) Field of Search ........................... 588/2, 3, 4, 15, 588/18, 236, 252, 256, 258, 901, 231, 249; 470/219; 405/128, 129

(56) References Cited

U.S. PATENT DOCUMENTS

| 3,837,872 A | | 9/1974 | Conner |
| 4,028,130 A | | 6/1977 | Webster et al. |
| 4,124,405 A | | 11/1978 | Quienot |
| 4,847,008 A | * | 7/1989 | Boatner et al. ............. 252/629 |
| 5,037,479 A | | 8/1991 | Stanforth |
| 5,249,889 A | | 10/1993 | Sierzega |
| 5,732,367 A | | 3/1998 | Yost et al. |
| 5,788,023 A | * | 8/1998 | Studer et al. ............... 588/256 |
| 5,931,773 A | * | 8/1999 | Pisani ........................ 588/256 |

FOREIGN PATENT DOCUMENTS

| DE | 195 29 850 | 2/1997 |
| EP | 0 355 507 | 2/1990 |
| GB | 1 160 029 | 7/1969 |
| GB | 2 224 024 | 4/1990 |
| WO | 92 18437 | 10/1992 |
| WO | 97 20784 | 6/1997 |

* cited by examiner

Primary Examiner—Steven P. Griffin
Assistant Examiner—Eileen E. Nave
(74) Attorney, Agent, or Firm—Collard & Roe, P.C.

(57) ABSTRACT

A method of encapsulating hazardous waste materials including heavy metals such as arsenic, mercury, nickel and chromium residues, as well as radioactive materials. The method involves adding the hazardous waste material to a settable composition, forming a slurry, and allowing the slurry to set to encapsulate the waste material. The settable composition is a powdered flowable cement composition containing calcium carbonate and a caustic magnesium oxide. Tests conducted on the encapsulated material indicate that virtually none of the hazardous waste material is leached out of the set composition which has a concrete-like appearance.

21 Claims, No Drawings

ENCAPSULATION OF HAZARDOUS WASTE MATERIALS

FIELD OF THE INVENTION

This invention relates to settable compositions which can encapsulate hazardous waste materials and relates particularly, though not exclusively, to a method of encapsulating hazardous waste materials including heavy metals such as arsenic, nickel, chromium residues and mercury as well as radioactive materials.

BACKGROUND TO THE INVENTION

Arsenic and arsenic containing compositions have been widely used in Australia as sheep and cattle dips, and have also been used in pesticides. Mercury and mercury containing compositions have also been widely used in Australia and other countries. With the phasing out of arsenic and mercury compounds (due to their toxicity), a large stockpile of waste arsenic and mercury components exists.

Organo nickel and chromium, and nickel and chromium containing compositions are widely used in Australia and other countries. Metal plating and anodising processes use these compounds, and the processes generate waste nickel and chromium residues which are quite concentrated and are stored in drums. The residue is hazardous and toxic and a large stockpile of waste nickel and chromium components exists.

The above mentioned hazardous waste materials and toxic components are housed in drums which have a limited life. The components in the drum are typically in the form of a contaminated liquid or sludge which is almost impossible to safely encapsulate. The sludge contains a variety of contaminants such as rust from the drum, waste particles, solids, and a variety of liquids.

Radioactive materials and components are also hazardous substances. Apart from their use as fuel for nuclear reactors, radioactive materials also have medical applications and other industrial applications. For example, radioisotopes are used in the medical field for the diagnosis and treatment of various types of illness. In some industries, for example in the mining industry, a radioactive source is used in certain types of instruments for measuring, for example, the thickness of materials. However, one of the problems associated with using radioactive materials is finding a socially and environmentally acceptable method of disposing of the radioactive waste materials. Various proposals have been put forward for encasement or encapsulation of radioactive materials which can than be safely disposed of by burial in uninhabited regions of the Earth.

Attempts to encapsulate hazardous waste materials in concrete have met with limited success as concrete and cement do not bind well in the presence of contamination. However, concrete or concrete like products are ideal for encapsulation as the concrete is hard, has a very long life, and can be moulded prior to setting.

SUMMARY OF THE INVENTION

The present invention is directed to a method by which hazardous waste materials or components thereof can be encapsulated, even if the materials are contaminated with other impurities.

According to one aspect of the present invention there is provided a method of encapsulating a hazardous waste material or component thereof, the method comprising: adding the hazardous waste material to a settable composition, the composition comprising a calcium carbonate and a caustic magnesium oxide, forming a slurry, and allowing the slurry to set to encapsulate the waste material or components thereof.

According to another aspect of the invention there is provided a method of encapsulating an arsenic component selected from the group consisting of arsenic, sodium arsenite, arsenic trioxide or arsenic pentoxide, the method comprising:

adding to the arsenic component a sulphate, an iron chloride and/or an alkaline agent, and water to form a slurry, mixing the slurry with a settable composition, the composition comprising a calcium carbonate and a caustic magnesium oxide, and allowing the composition to set to encapsulate the arsenic component.

It is found that when encapsulated in this matter, very little arsenic is leached out of the set composition which has a concrete like appearance.

Indeed, leach rates are less that the allowed leach rate of 5.00 ppm arsenic. The sulphate which is added to the slurry is preferably an aluminium sulphate. The alkaline agent is preferably a carbonate such as calcium carbonate. The iron chloride can comprise ferric chloride.

Suitable ranges include:

Arsenic component—100 weight units (e.g. grams),

Sulphate—10–80 weight units, more preferably about 50 weight units,

Alkaline agent (e.g. calcium carbonate)—10–80 weight units.

Ferric chloride (if present)—5–50 weight units.

To form a slurry 100–500 weight units of water per 100 weight units of arsenic component can be added.

According to a further aspect of the invention there is provided a method of encapsulating mercury or components thereof, the method comprising: adding the mercury or components thereof to a settable composition, the settable composition comprising a calcium carbonate and a caustic magnesium oxide, forming a slurry, and allowing the slurry to set to encapsulate the mercury or components thereof.

It is found that when encapsulated in this matter, very little mercury is leached out of the set composition which has a concrete like appearance. Indeed, leach rates are less than the allowed leach rate of 5.00 ppm mercury.

The mercury waste is typically stored as a sludge. One source of mercury waste is from Clarriflocculator sludge, or Brine sludge. This sludge contains between 100–200 mg of mercury per kilogram of sludge, as well as water, dust/soil, and other impurities, which makes encapsulation in concrete unsatisfactory.

Suitable ranges for the method include:

Mercury containing sludge—1000 grams,

Settable composition—1000 grams,

Water—270 ml.

Additives—100 grams.

According to a still further aspect of the invention there is provided a method of encapsulating nickel. and chromium or components thereof, the method comprising:

adding the nickel and chromium or components thereof to a settable composition, the settable composition comprising a calcium carbonate and a caustic magnesium oxide, forming a slurry, and allowing the slurry to set to encapsulate the nickel and chromium and components thereof.

It is found that when encapsulated in this matter, very little nickel and chromium is leached out of the set composition which has a concrete like appearance. Indeed, leach rates are less than the allowed leach rate of 0.2 ppm nickel and chromium.

The nickel and chromium waste is typically stored as a thick liquid or sludge. One source of nickel and chromium waste is from the metal plating and anodising industry. This liquid can contain between 10 mg–28,000(?)mg of nickel and about 10 mg–200,000 mg chromium per kilogram of liquid, as well as water, dust/soil, and other impurities, which makes encapsulation in concrete unsatisfactory.

If desired, a filler can be used. The filler can include an ash, but other fillers are envisaged. The filler can comprise between 10–90% of the set composition, and more preferably between 40–60%

Suitable non-limiting ranges for the method include:

Nickel and chromium containing liquid—150 ml,

Settable composition—300 grams,

Water—400 ml.

Additives—100 grams.

According to yet another aspect of the invention there is provided a method of encapsulating radioactive materials, the method comprising: adding the radioactive materials to a settable composition, the settable composition comprising a calcium carbonate and a caustic magnesium oxide, forming a slurry, and allowing the slurry to set to encapsulate the radioactive material therein.

It is found that when encapsulated in this matter, virtually no radioactive material is leached out of the set composition which has a concrete-like appearance. Furthermore, radioactivity levels of the leached material are well below the background radiation level.

The method of encapsulation according to the invention is particularly suited to low to mid level radioactive material, for example, monazite. Preferably, the radioactive material is added to the settable composition in the form of a powder. Preferably the radioactive material or components thereof are ground to a particle size in the range from 0.01 $\mu$m to 5.0 mm, more preferably the particle size falls within the range 0.1 $\mu$m to 1.0 mm.

Preferably the settable composition further comprises lead or a lead compound such as, for example, lead oxide. It is thought that the lead in the composition assists in absorbing the radiation from the radioactive material.

Suitable non-limiting ranges for the method include:

Radioactive material—1000 grams,

Settable composition—700 to 2200 grams,

Lead oxide—300 to 1500 grams

Water—500 to 900 ml.

Additives—250 to 375 grams.

The term caustic magnesium oxide includes a magnesium composition which comprises magnesium carbonate and a decarbonated magnesium. The term also covers a magnesium carbonate which has been treated, for instance, by heating, to liberate carbon dioxide, thereby forming a composition which is partially calcined. The exact structure of the composition and of the caustic magnesium oxide is not known, but the term will be used to include the structure formed by heating magnesium carbonate to partially decarbonate it, especially at the temperature ranges described.

The composition of calcium carbonate and caustic magnesium oxide can be formed by treating dolomite. Dolomite is a calcium magnesium carbonate found in nature. A true dolomite comprises about 54% calcium carbonate and 43% magnesium carbonate. Natural dolomites contain impurities of various differing types which can include alumina, iron and silica.

The percentage of the calcium and magnesium carbonate can vary in dolomites. For instance, dolomite containing 65% calcium carbonate and 30% magnesium carbonate is called a low magnesium dolomite. Conversely, a dolomite containing 60% magnesium carbonate and 30% calcium carbonate is called a high magnesium dolomite.

It is found that heating dolomite will cause carbon dioxide to be liberated, and the rate of liberation of carbon dioxide can be controlled and varied to provide fully or partially calcined dolomites.

If the dolomite is heated at 1,500° C., all the carbonate is liberated as carbon dioxide and a mixture of calcium oxide and magnesium oxide is left. These oxides are well known as for use in refractory material, but the oxides are not suitable for a cementitious material.

If dolomite is heated at a lower temperature, not all of the carbonate decomposes to liberate carbon dioxide. Indeed, it is noted that the heating can be controlled such that the magnesium carbonate preferentially releases carbon dioxide over the calcium carbonate.

Thus, heating at a temperature range of typically between 500–800° C. will cause preferential decomposition of the magnesium carbonate.

By controlling the preferential decomposition, dolomite can be treated to form a settable composition by the dolomite into a composition comprising a caustic magnesium oxide.

The preferential decomposition of dolomite can be enhanced by additives such as inorganic salts. A suitable salt is a metal sulphate such as aluminium sulphate or magnesium sulphate which can be added from 0.1%–5% prior to heating. The salt appears to preferentially decrease the decarbonisation temperature of $MgCO_3$ without substantially affecting the higher decarbonisation temperature of $CaCO_3$. The salt can increase the differential temperature from 100° C. to 200° C.

Suitably, the caustic magnesium oxide has between 0.1%–50% of the carbon dioxide retained within the magnesium carbonate, and preferably between 23%–28%.

While the molecular structure may be difficult to envisage, the structure may comprise a mix of calcium carbonate, magnesium oxide, and magnesium carbonate. The amount of carbon dioxide retained in the composition has an effect on various parameters such as hardness, and setting rate. Between 20%–30% retained carbon dioxide offers a suitable set rate for many applications. Increasing the amount of carbon dioxide decreases the set rate, and decreasing the amount of carbon dioxide increases the set rate.

The composition can also be prepared synthetically by mixing or blending calcium carbonate with preformed caustic magnesium oxide. In this variation, the caustic magnesium oxide can be prepared by subjecting heat to partially drive off carbon dioxide until the desired level of calcination is obtained.

In a further variation, a natural dolomite may be heated in the manner described above to provide a composition comprising calcium carbonate and caustic magnesium oxide, and if the natural dolomite is magnesium deficient (for instance, a low magnesium dolomite), additional caustic magnesium oxide can be added to the mixture.

For example, a low magnesium dolomite ore containing 65% calcium carbonate and 30% magnesium carbonate plus impurities can be calcined so that the magnesium converts to partially calcined caustic magnesium oxide but essentially where between 2%–20% of the original entrained carbon dioxide within the magnesium is retrained.

By being able to add caustic magnesium oxide, and calcium carbonate, and being able to vary the blend of the two, it is possible to provide compositions for use as cement having any required predetermined weight or percentage of the blended materials.

The particle size of the composition can be varied if desired. A suitable particle size of 50–70 micron with 90% passing through a 60 micron sieve allows the composition to be used in a variety of applications. The composition can be ground to the particle size if required and this can be done before or after treatment. Other particle size ranges are also envisaged such as from 10–1000 microns.

A range of 10%–90% caustic magnesium oxide and 90%–10% calcium carbonate can be used, with a preferred mix being 60%–70% magnesium and 30%–40% calcium.

For instance, one tonne of dolomite will contain 650 kilograms (kg) of calcium carbonate ($CaCO_3$) and 300 kg of magnesium carbonate ($MgCO_3$) plus 5% impurities. The magnesium carbonate will contain 156:57 kg of $CO_2$. When 95% of this $CO_2$ is removed the weight loss will be 148:74 kg. The calcined weight of the dolomite will now be 851:26 kg which will include 650 kg of calcium carbonate plus 143.3 kg of magnesia oxide and 50 kg of impurities. ($CaCO_3$650 kg/MgO 143:43 kg+7:8285 kg+impurities 50 kg=851.26.)

EXAMPLE

Dolomite 1000 kg=650 kg $CaCO_3$ before calcination
   300 kg $MgCO_3$+50 kg impurities
After calcination=650 kg $CaCO_3$
   151:258 kg caustic (MgO+7.8$CO_2$)+desired weight of
      selected caustic magnesia oxide+impurities 50 kg The composition can be formulated as a dry fine powder (that is similar to the Portland Cement powder).

Another source of the composition can be based on the calcined magnesites and dolomites directly from the magnesium industry. These are predominantly magnesium oxide (typically over 90%) with calcium oxide (ranging 3–18%) and containing a low amount of (0–5%) carbon dioxide. This commercial form of caustic magnesium oxide may even contain dead burnt calcium oxide or dead burnt magnesium oxide but is still useful in the encapsulation process although it is not specifically calcined for encapsulation.

To the composition can be added various additives. The additive or additives may accelerate the formation of strong binding agents, and may assist in the recrystallisation of the composition to make it set. In the setting process, various added fillers (which can include organic fillers, inorganic fillers, solid and liquid fillers, radioactive fillers, toxic fillers, and the like) can be trapped in the set matrix.

One additive can comprise a sulphate which may be added at rates of between 0.01% up to 20%, more typically 0.01% up to 10%. A suitable sulphate can comprise sulphuric acid, or a metal sulphate such as magnesium sulphate or aluminium sulphate.

Another desirable additive is one which act as a source of carbonation in the composition to assist in the setting process. A carbonate which can decompose or react to liberate carbon dioxide is preferred. One suitable additive can be a metal carbonate such as sodium carbonate. Another suitable additive can include a carboxylic or polycarboxylic acid which can react to liberate carbon dioxide. Another advantage of sodium carbonate is that it will carbonate any completely oxidised fillers which may be used (for instance coal ash).

Other additives may include citric acid, lemon acid, acetic acid, glycolic acid, oxalic acid, other di or poly carboxylic acids, or other acidifying agents. Possible substitutes for the citric acid include tartaric acid, Salicylic acid, ethylenediamine tetra acetic acid (EDTA) or other tetra acids. These additives may be added at between 0.01%–10%, more typically 0.01% to 5%. If the additives (such as citric acid or lemon acid) are solids, they are suitably pre-ground and powdered to enable them to be efficiently blended with the remainder of the composition. A grind size<250 mesh can be used. The aluminium sulphate may be commercially available aluminium sulphate having a hydration figure of 14. Of course, higher or lower hydrated aluminium sulphates can also be used with the appropriate weight adjustments.

Another acidifying agent may comprise sulphuric acid and this may be added to the water mixture in up to 5% by weight.

In a preferred feature, the additives include aluminium sulphate and a citric acid (or equivalent acid such as glycolic acid or acetic acid). Additionally, a salt such as sodium chloride can be provided.

The additives can be premixed and added to the composition. The amount of premix added can vary for instance from about 3%–10% or more. It appears that when fillers of small size (for example below 70 micron) are used, the amount of premix added should be larger (about 10%), while fillers of larger size allow less premix to be added (e.g. 3%–7%).

If the premix comprises (a) aluminium sulphate, (b) an organic acid and (c) a salt, it is preferred that (a) is present between 40%–80%; (b) is present between 10%–60% and (c) is present between 1%–20%.

While not wishing to be bound by theory, it appears that ingredient (a) provides early strength to the set composition, and may assist in the formation of brucite ($Mg(OH)_2$), and a gelatinous polymer of aluminium hydroxide, both which help with initial bonding of the composition. It also appears that (a) provides water proofing properties.

Ingredient (b), for instance citric acid, appears to assist in the carbonisation of MgO and $Mg(OH)_2$ to recrystallise the composition into a set material. The acid may also act as a ligand to form complexes around the fillers (for instance metal ions) helping to trap them in the setting or set matrix. The carbonisation process can continue over a long period of time which can provide long lasting strength to the set material. Ingredient (c) appears to assist in achieving an early strength to the composition.

DETAILED DESCRIPTION OF PREFERRED EMBODIMENTS

Embodiments of the invention will now be described by the following examples.
Arsenic

EXAMPLE 1

Sodium Arsenite 100 g, aluminium sulphate 50 g, ferric chloride 20 g, calcium carbonate 50 g and water 300 ml are slurried together and left to stand for 10 minutes during which separation of the metal occurred and flocculation was observed. This slurry was added to a slurry of a settable composition which contained 400 g of calcium carbonate and caustic magnesium oxide, 400 g of a filer (ash—to soak up excesss water), and 160 gm of a mixture of 50 g aluminium sulphate, 100 g citric acid and 10 g soda ash. The thickness of the total mixture could be adjusted by addition of water to form a mouldable composition which can have a slump value of between 80–120 (i.e. about that of a cement slurry). The total mixture was poured into moulds and set.

A Leach rate analysis showed an arsenic leach of 2.1 ppm which was much less than the allowed limit of 5.0 ppm.

EXAMPLE 2

Powdered arsenic 100 g, aluminium sulphate 50 g, ferric chloride 20 g, calcium carbonate 50 g and water 300 ml are slurried together and left to stand for 10 minutes during which separation of the metal occurred and flocculation was observed. This slurry was added to a slurry of a settable composition which contained 400 g of calcium carbonate and caustic magnesium oxide, 400 g of a filler (ash—to soak up excess water), and 160 g of a mixture of 50 g aluminium sulphate, 100 g citric acid and 10 g soda ash. The thickness of the total mixture could be adjusted by addition of water to form a mouldable composition which can have a slump value of between 80–120 (i.e. about that of a cement slurry). The total mixture was poured into moulds and set.

A Leach rate analysis showed an arsenic leach of 4.1 ppm which was less than the allowed limit of 5.0 ppm.

EXAMPLE 3

Arsenic Trioxide 100 g, aluminium sulphate 50 g, ferric chloride 20 g, calcium carbonate 50 g and water 300 ml are slurried together and left to stand for 10 minutes during which separation of the metal occurred and flocculation was observed. This slurry was added to a slurry of a settable composition which contained 400 g of calcium carbonate and caustic magnesium oxide, 400 g of a filler (ash—to soak up excess water), and 160 g of a mixture of 50 g aluminium sulphate, 100 g citric acid and 10 g soda ash. The thickness of the total mixture could be adjusted by addition of water to form a mouldable composition which can have a slump value of between 80–120 (i.e. about that of a cement slurry). The total mixture was poured into moulds and set.

A Leach rate analysis showed an arsenic leach of 4.1 ppm which was much less than the allowed limit of 5.0 ppm.

EXAMPLE 4

Arsenic Pentoxide 100 g, aluminium sulphate 50 g, ferric chloride 20 g, calcium carbonate 50 g and water 300 ml are slurried together and left to stand for 10 minutes during which separation of the metal occurred and flocculation was observed. This slurry was added to a slurry of a settable composition which contained 400 g of calcium carbonate and caustic magnesium oxide, 400 g of a filler (ash—to soak up excess water), and 160 g of a mixture of 50 g aluminium sulphate, 100 g citric acid and 10 g soda ash. The thickness of the total mixture could be adjusted by addition of water to form a mouldable composition which can have a slump value of between 80–120 (i.e. about that of a cement slurry). The total mixture was poured into moulds and set.

A Leach rate analysis showed an arsenic leach of 4.1 ppm which was much less than the allowed limit of 5.0 ppm.

EXAMPLE 5

Powdered Arsenic 100 g, aluminium sulphate 50 g, calcium carbonate 20 g and water 150 ml are slurried together and left to stand for 10 minutes during which separation of the metal occurred and flocculation was observed. This slurry was added to a slurry of a settable composition which contained 200 g of calcium carbonate and caustic magnesium oxide, 400 g of a filer (ash—to soak up excess water), and 10 g of a mixture of 30 g aluminium sulphate, 60 g citric acid and 10 g soda ash. The thickness of the total mixture could be adjusted by addition of water to form a mouldable composition which can have a slump value of between 80–120 (i.e. about that of a cement slurry). The total mixture was poured into moulds and set.

A Leach rate analysis showed an arsenic leach of 1.0 ppm which was much less than the allowed limited of 5.0 ppm.

Mercury

EXAMPLE 6

Mercury from a mercury-containing brine sludge is encapsulated: in the following manner. The brine sludge contains between 100–200 mg of mercuric per kilogram of sludge. The sludge additionally contains 10–29% calcium carbonate, 1–9% magnesium hydroxide, 10–29% sodium chloride, 1–9% soil/dust and 30–60% water. The sludge is a waste produce from brine purification. The sludge is an odourless brown sludge insoluble in water. The sludge has a pH of 11.6 and a specific gravity of 1.29.

1 kg of the brine sludge, 900 g of settable composition, 270 g of water, 50 g of aluminium sulphate and 50 g of citric acid were mixed in a mixer. If desired, water is added to form a mouldable composition. The mixture is poured into moulds and set.

A leach rate analysis showed a mercury leach of less than 0.01 parts p/million making the encapsulated composition safe for unlined tip storage.

Nickel and Chromium

EXAMPLE 7

150 ml of an undiluted fully concentrated nickel and chromium containing residue (containing 360 mg p/litre chromium and 28,000 mg p/litre nickel), 400 ml water, 150 g calcium carbonate and 40 g of aluminium sulphate are mixed together to form a slurry. To the slurry is added 300 g of calcium carbonate and caustic magnesium oxide, 60 g of aluminium sulphate, 34 g of citric acid, 6 g of soda ash, 1 kg of filler (powerhouse ash) and an additional 50 ml of water. The thickness of the total mixture can be adjusted with water to form a mouldable composition. The mixture is poured into moulds and left to cure for T.C.L.P. tests (Toxic Characteristic Leachate Procedures). After 30 days of testing, a leach rate of below 0.2 parts p/million was established showing that the encapsulated product is suitable for storage in an unlined tip.

EXAMPLE 8

150 ml of an undiluted fully concentrated nickel and chromium containing residue (containing 3.1 mg p/litre chromium and 1,100 mg p/litre nickel), 400 ml water, 150 g calcium carbonate and 40 g of aluminium sulphate are mixed together to form a slurry. To the slurry is added 300 g of calcium carbonate and caustic magnesium oxide, 60 g of aluminium sulphate, 34 g of citric acid and 6 g of soda ash, 1 kg of filler (powerhouse ash) and an additional 50 ml of water. The thickness of the total mixture can be adjusted with water to form a mouldable composition. The mixture is poured into moulds and lets to cure for T.C.L.P. tests (Toxic Characteristic Leachate Procedures). After 30 days of testing, a leach rate of below 0.2 parts p/million was established showing that the encapsulated product is suitable for storage in an unlined tip.

Radioactive Monazite

Tests were conducted using a powdered sample of the mineral monazite. Monazite is a monoclinic phosphate of the rare earth elements containing the cerium groups (Ce, La, Y, Th) PO4, as well as some uranium and thorium. Monazite is relatively abundant in beach sands, and is one of the principal sources of rare earth minerals and thorium. Thorium is used as a radioactive source in scientific instruments. Rare earth compounds are used in various manufacturing processes, including the manufacturing of glass and certain metals.

Analysis of the monazite material employed in the tests found that it contained 246 Becquerels per gram (Bq/gm) of thorium-232 and 28 Bq/gm of uranium-238. The half life of the thorium contained in the monazite is approximately 4.5 billion years ($4.5 \times 10^9$). The monazite particle size can be from dust (approx. 0.1 μm) up to particles of approximately 1.0 mm, ideally. The lead tailings, caustic magnesium oxide and calcium carbonate were all preground to approximately 110 μm, ie. 90% passed through a 150 μm sieve.

EXAMPLE 9

300 grams of monazite, of radioactivity 246 becquerels per gram thorium and 28.1 becquerels per gram uranium, 400 grams of caustic magnesium oxide and a mixture of 480 grams of lead tailings (ex Mt. Isa) and 320 grams calcium carbonate were thoroughly dry mixed with 100 grams of aluminium sulphate and 25 grams of citric acid. To this was added 300 mLs of water to form a thick rapidly setting paste. The thickness of the total mixture could be adjusted by the addition of water to form a mouldable composition. The total mixture was poured into moulds and allowed to set.

The radioactivity of the encapsulated monazite mixture was measured to be 44.60±0.20 becquerels per gram thorium and 5.06±0.21 becquerels per gram uranium.

A leach rate analysis (TCLP test) was carried out at 14 days and 28 days to determine the leachable uranium and thorium. At 14 days the leachable uranium was less than 0.05 micrograms per litre and the leachable thorium was 0.25 micrograms per litre. At 28 days the leachable uranium was 0.05 micrograms per litre and the leachable thorium was 0.45–0.50 micrograms per litre.

Gamma spectroscopy was carried out on the TCLP solutions to determine the levels of radioactive uranium and thorium at 14 and 28 days. At 14 days the leachable uranium radioactivity was below detectable levels or equivalent to <1 part per million and the leachable thorium radioactivity was 0.034±0.007 becquerels per gram. At 28 days the leachable uranium radioactivity was below detectable levels or equivalent to <1 per million and the leachable thorium radioactivity was below detectable levels or equivalent to <2 parts per million.

EXAMPLE 10

500 grams of monazite, of radioactivity 246 becquerels per gram thorium and 28.1 becquerels per gram uranium, 450 grams of caustic magnesium oxide and a mixture of 360 grams of lead tailings (ex Mt. Isa) and 240 grams calcium carbonate were thoroughly dry mixed with 100 grams of aluminium sulphate and 25 grams of citric acid. To this was added 310 mLs of water to form a thick rapidly setting paste. The thickness of the total mixture could be adjusted by the addition of water to form a mouldable composition. The total mixture was poured into moulds and allowed to set.

The radioactivity of the encapsulated monazite mixture was measured to be 70.20±0.30 becquerels per gram thorium and 8.01±0.31 becquerels per gram uranium.

A leach rate analysis (TCLP test) was carried out at 14 days and 28 days to determine the leachable uranium and thorium. At 14 days the leachable uranium was less than 0.05 micrograms per litre and the leachable thorium was 0.15 micrograms per litre. At 28 days the leachable uranium was 0.05 micrograms per litre and the leachable thorium was 0.15–0.45 micrograms per litre.

Gamma spectroscopy was carried out on the TCLP solutions to determine the levels of radioactive uranium and thorium at 14 and 28 days. At 14 days the leachable uranium radioactivity was below detectable levels or equivalent to <1 part per million and the leachable thorium radioactivity was below detectable levels or equivalent to <2 parts per million. At 28 days the leachable uranium radioactivity was below detectable levels or equivalent to <1 part per million and the leachable thorium radioactivity was 0.038±0.007 becquerels per gram.

EXAMPLE 11

800 grams of monazite, of radioactivity 246 becquerels per gram thorium and 28.1 becquerels per gram uranium, 400 grams of caustic magnesium oxide and a mixture of 300 grams of lead tailings (ex Mt. Isa) and 200 grams calcium carbonate were thoroughly dry mixed with 100 grams of aluminium sulphate and 25 grams of citric acid. To this was added 400 mLs of water to form a thick rapidly setting paste. The thickness of the total mixture could be adjusted by the addition of water to form a mouldable composition. The total mixture was poured into moulds and allowed to set.

The radioactivity of the encapsulated monazite mixture was measured to be 104.0±0.41 becquerels per gram thorium and 12.0±0.42 becquerels per gram uranium.

A leach rate analysis (TCLP test) was carried out at 14 days and 28 days to determine the leachable uranium and thorium. At 14 days the leachable uranium was 0.05 micrograms per litre and the leachable thorium was 0.25 micrograms per litre. At 28 days the leachable uranium was 0.10 micrograms per litre and the leachable thorium was 1.10–1.40 micrograms per litre.

Gamma spectroscopy was carried out on the TCLP solutions to determine the levels of radioactive uranium and thorium at 14 and 28 days. At 14 days the leachable uranium radioactivity was below detectable levels or equivalent to <1 part per million and the leachable thorium radioactivity was below detectable levels or equivalent to <2 parts per million. At 28 days the leachable uranium radioactivity was below detectable levels or equivalent to <1 part per million and the leachable thorium radioactivity was 0.038±0.007 becquerels per gram.

In each of the above examples 9 to 11 the leach rate solutions were all less than 10 parts per million (ppm) for thorium and uranium, indicating successful encapsulation of the radioactive material.

It should be appreciated that various other changes and modifications can be made to the embodiments without departing from the spirit and scope of the invention, the nature of which is to be determined from the foregoing description and the appended claims. Furthermore, the preceding examples are provided for illustrative purposes only, and are not intended to limit the scope of the process of the invention.

The claims defining the invention are as follows:

1. A method of encapsulating a hazardous waste material or components thereof, the method comprising:
    adding the hazardous waste material to a settable composition, the composition comprising a calcium carbonate, a caustic magnesium oxide and an additive, and wherein the additive is an organic acid selected from the group consisting of citric acid, lemon acid, acetic acid, glycolic acid, oxalic acid, and other di or poly carboxylic acids, tartaric acid, salicylic acid, ethylenediamine tetra acetic acid (EDTA) and other tetra acids;
    forming a slurry; and
    allowing the slurry to set to encapsulate the hazardous waste material or components thereof, the additive accelerating the formation of strong binding agents and assisting the recrystallisation of the composition to make it set.

2. A method of encapsulating as defined in claim 1, wherein the additive is present between 0.01% and 10% by weight of the total composition.

3. A method of encapsulating as defined in claim 1, wherein the organic acid is present between 0.01% to 10% by weight of the total composition.

4. A method of encapsulating as defined in claim 3, wherein the organic acid assists in carbonisation of caustic magnesium oxide to recrystallise the composition into a set material that encapsulates the hazardous waste material.

5. A method of encapsulating as defined in claim 4, wherein the additive acts as a ligand to form complexes around the hazardous waste material or components thereof, helping to trap the hazardous waste material or components thereof in the set material.

6. A method of encapsulating as defined in claim 1, wherein the settable composition further comprises an inorganic salt.

7. A method of encapsulating as defined in claim 6, wherein the inorganic salt is a metal salt selected from the group consisting of aluminum sulphate, magnesium sulphate and sodium chloride.

8. A method of encapsulating as defined in claim 7, wherein the inorganic salt is present between 0.1%–5% by weight of the total composition.

9. A method of encapsulating as defined in claim 1, wherein the hazardous waste material or components thereof is in the form of a powder having a mean particle size falling within the range of 0.01 mm to 5.0 mm.

10. A method of encapsulating as defined in claim 9, wherein the mean particle size falls within the range of 0.1 mm to 1.0 mm.

11. A method of encapsulating as defined in claim 1, wherein the caustic magnesium oxide of the settable composition is selected from the group consisting of:
   (a) a magnesium composition which comprises magnesium carbonate and a decarbonated magnesium;
   (b) a magnesium carbonate which has been treated by heating to liberate carbon dioxide thereby forming a composition which is partially calcined;
   (c) a synthetic blend formed by mixing calcium carbonate with preformed caustic magnesium oxide, the preformed magnesium oxide being prepared by heating magnesium carbonate to partially drive off carbon dioxide until a desired level of calcination is obtained; and
   (d) a magnesium deficient dolomite heated to form a composition comprising calcium carbonate and caustic magnesium oxide, and to which is added additional caustic magnesium oxide.

12. A method of encapsulating as defined in claim 11, wherein the caustic magnesium oxide has between 2%–50% of the carbon dioxide retained within the magnesium carbonate.

13. A method of encapsulating as defined in claim 1, wherein the settable composition further comprises a sulphate additive present between 0.01% and 20% by weight of the total composition; and
   wherein the sulphate is selected from the group consisting of sulphuric acid, a metal sulphate, magnesium sulphate and aluminum sulphate.

14. A method of encapsulating arsenic or components thereof, the method comprising:

adding to the arsenic or components thereof a sulphate, an iron chloride and/or an alkaline agent, and water forming a slurry;
mixing the slurry with a settable composition, the composition comprising a calcium carbonate, a caustic magnesium oxide and an additive, and wherein the additive is an organic acid selected from the group consisting of citric acid, lemon acid, acetic acid, glycolic acid, oxalic acid, and other di or poly carboxylic acids, tartaric acid, salicylic acid, ethylenediamine tetra acetic acid (EDTA) and other tetra acids; and
allowing the composition to set to encapsulate the arsenic or components thereof, the additive accelerating the formation of strong binding agents and assisting in the recrystallisation of the composition to make it set.

15. A method of encapsulating as defined in claim 14, wherein said sulphate added to the arsenic or components thereof is aluminium sulphate.

16. A method of encapsulating as defined in claim 14, wherein said alkaline agent added to the arsenic or components thereof is a carbonate.

17. A method of encapsulating as defined in claim 16, wherein said iron chloride added to the arsenic or components thereof is ferric chloride.

18. A method of encapsulating mercury or components thereof, the method comprising:
   adding the mercury or components thereof to a settable composition, the settable composition comprising a calcium carbonate, a caustic magnesium oxide and an additive, and wherein the additive is an organic acid selected from the group consisting of citric acid, lemon acid, acetic acid, glycolic acid, oxalic acid, and other di or poly carboxylic acids, tartaric acid, salicylic acid, ethylenediamine tetra acetic acid (EDTA) and other tetra acids;
   forming a slurry; and
   allowing the slurry to set to encapsulate the mercury or components thereof, the additive accelerating the formation of strong binding agents and assisting the recrystallisation of the composition to make it set.

19. A method of encapsulating nickel and chromium or components thereof, the method comprising:
   adding the nickel and chromium or components thereof to a settable composition, the settable composition comprising a calcium carbonate, and caustic magnesium oxide and an additive, and wherein the additive is an organic acid selected from the group consisting of citric acid, lemon acid, acetic acid, glycolic acid, oxalic acid, and other di or poly carboxylic acids, tartaric acid, salicylic acid, ethylenediamine tetra acetic acid (EDTA) and other tetra acids;
   forming a slurry; and
   allowing the slurry to set to encapsulate the nickel and chromium or components thereof, the additive accelerating the formation of strong binding agents and assisting the recrystallisation of the composition to make it set.

20. A method of encapsulating radioactive materials, the method comprising:
   adding the radioactive materials to a settable composition, the settable composition comprising a calcium carbonate, a caustic magnesium oxide, and an additive, and wherein the additive is an organic acid selected from the group consisting of citric acid, lemon acid, acetic acid, glycolic acid, oxalic acid, and other di or poly carboxylic acids, tartaric acid, salicylic acid, ethylenediamine tetra acetic acid (EDTA) and other tetra acids;

forming a slurry; and allowing the slurry to set to encapsulate the radioactive materials therein, the additive accelerating the formation of strong binding agents and assisting the recrystallisation of the composition to make it set.

21. A method of encapsulating as defined in claim 20, wherein the settable composition further comprises lead or a lead compound.

* * * * *